Dec. 2, 1969    L. W. JONES    3,481,869

INHIBITING SCALE

Filed May 7, 1968

LOYD W. JONES
INVENTOR.

BY Buell B. Hamilton

ATTORNEY

United States Patent Office 3,481,869
Patented Dec. 2, 1969

3,481,869
INHIBITING SCALE
Loyd W. Jones, Tulsa, Okla., assignor to Pan American Petroleum Corporation, Tulsa, Okla., a corporation of Delaware
Filed May 7, 1968, Ser. No. 727,186
Int. Cl. C02b 5/06
U.S. Cl. 210—58   12 Claims

ABSTRACT OF THE DISCLOSURE

A high-density, water solution of amino phosphonic acid scale inhibitor is provided by forming the potassium salt of the acid and weighting the solution with tetrapotassium pyrophosphate. The combination is not only heavy, but provides improved scale inhibition at low concentrations and has a very low freezing point.

---

Figure 1:
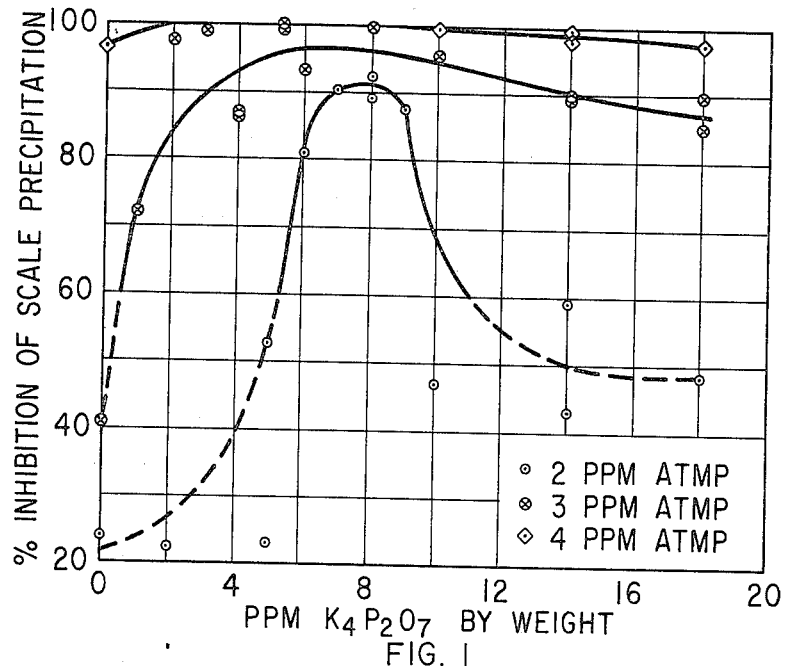

Several references suggest the strong chelating action of amino phosphonic acids and their salts. These include U.S. Patents 2,599,807 Bersworth, 2,917,528 Ramsey, 2,841,611 Bersworth, and 3,234,124 Irani. Use of amino phosphonic acids and their salts to inhibit scale formation in oil wells is taught in Canadian Patent 775,524 Ralston, and U.S. Patent 3,336,221 Ralston. Amino phosphonic acids and their salts have been used commercially as scale inhibitors in oil wells. A particularly effective material is the sodium salt of amino tri(methylphosphonic acid).

In one method of treating wells, not only for scale inhibition but for other purposes, a high-density liquid treating agent is placed in the bottom of a well. The agent then slowly diffuses into the liquids flowing into the well and being pumped from the well. The sodium salt of amino tri(methylphosphonic acid) is advantageous in such a process since the 40-percent solution, which is commercially available, has a rather high density of about 1.4 grams per milliliter. Oil-field brines rarely have a density exceeding about 1.2, so the 40-percent solution tends to stay in the bottom of the well.

The solutions of sodium amino phosphonates have two disadvantages. In cold weather, particularly at temperatures below 0° F., the solutions become too viscous to handle conveniently. The second difficulty involves the density of the solutions. If the treating solution is introduced directly into the bottom of a well by a dump bailer, macaroni string, or the like, the density of about 1.4 is usually adequate. If the solution is to be poured down the well annulus or is otherwise introduced so it must fall through well fluids, the density should be greater. This is particularly true if the agent must fall through a considerable amount of water. A large density contrast is required in such cases to cause most of the agent to fall through the water rather than simply mixing with it. For this purpose, a treating-agent density of at least about 1.5 grams per milliliter is desirable.

I have found that water solutions of the potassium amino phosphonates have surprisingly low viscosities at low temperatures. This permits increasing the concentration of the salt to raise the solution density, while still retaining pourability at very low temperatures. Use of the potassium salts alone does not offer a complete solution to the problems, however. In order to attain a 1.5 density of the treating solution, the concentration of the salt must be increased to at least about 50 percent by weight. Use of such a high concentration of the salt results in wasteful overtreating in most wells. The phosphonate concentration cannot be decreased to reduce the amount of overtreating without dropping the solution density to an undesirably low value. In addition, the potassium phosphonate is expensive, so use of the unnecessarily high concentration of the expensive salt is not economically attractive.

With the above problems in mind, an object of this invention is to provide a liquid amino phosphonate scale inhibitor, which has a density of at least about 1.4 grams per milliliter, but remains pourable at temperatures down to about −20° F. A more specific object is to provide such an inhibitor having a density of at least about 1.5 grams per milliliter. Another specific object is to provide a liquid scale inhibitor having a density at least about 0.5 gram per milliliter greater than the density of the water in which the inhibitor is to be used so the inhibitor will sink rapidly through well fluids to the bottom of a well and will diffuse slowly into produced water. A still more specific object is to provide a liquid-phosphonate scale inhibitor having a phosphonate concentration of less than about 50 percent by weight and preferably less than about 30 percent by weight, but which still has a density of at least about 1.4, and preferably at least about 1.5 grams per milliliter while remaining pourable at a temperature of about −20° F.

In general, I accomplish the objects of my invention by use of a combination of potassium amino phosphonate with potassium pyrophosphate. For example, a water solution containing about 26 percent by weight of the potassium salt of amino tri(methylphosphonic acid) and about 27 percent by weight of potassium pyrophosphate has a density of about 1.52 but pours very satisfactorily at −20° F. The most surprising property of this combination, however, is that while potassium pyrophosphate has little ability to inhibit calcium sulfate scale when used alone under severe sulfate-scaling conditions, the pyrophosphate definitely helps the phosphonate to inhibit sulfate scale when the concentration of the phosphonate drops to lower values just before the next batch of treating agent is added. The combination effect is also useful when the two compounds are used in low concentrations for continuous treating, for example. The pyrophosphate is itself, of course, also beneficial in that it is one of the best known alkaline earth carbonate scale inhibitors. The combination phosphonate-pyrophosphate inhibitor is effective as an inhibitor for alkaline earth carbonate scales as well as for alkaline earth sulfate scales. It is also effective for inhibiting formation of mixed alkaline earth carbonate and sulfate scales.

The two figures of the drawing show the combination effects of potassium amino phosphonates and potassium pyrophosphate. The data on which the curves are based were obtained in the following test which has been found to be a very severe test of calcium sulfate scale inhibitors.

A solution of calcium chloride and a solution of sodium sulfate were mixed together. The concentrations of calcium chloride and sodium sulfate were sufficient to provide the equivalent of 10,000 parts per million by weight of calcium sulfate in supersaturated solution. Sodium chloride was also formed. Additional sodium chloride was dissolved in the sodium sulfate solution before mixing with the calcium chloride solution to bring the sodium chloride concentration in the final mixture up to 50,000 parts per million by weight. The solutions were mixed at room temperature, the scale inhibitors were added, and 200 milliliters of the inhibited solution were placed in a 300-milliliter tall-form beaker. The beaker was then placed in a hot water bath at 165° F. The solution came up to 165° F. in about 15 minutes, after which the beaker was allowed to remain in the bath for three hours. The precipitate was then filtered from the solution, dried and weighed. Comparison to a control sample run without inhibitor permitted calculating the percent of scale inhibition.

The potassium amino phosphate used in the tests reported in FIGURE 1 was prepared by mixing a 50- percent by-weight solution of amino tri(methylphosphonic acid) with potassium hydroxide in the ratio of about 2.15 grams of the acid solution per gram of the hydroxide. This provided about six atoms of potassium for each molecule of acid at a pH of about 8.6. The tetrapotassium pyrophosphate was added separately to the test solution. One series of tests was made with about two parts per million by weight of the amino tri(methylphosphonic acid)—four parts per million of the 50-percent solution, or 3.46 parts per million of the salt. Other series of tests were made using three and four parts per million of the acid. For convenience, amino tri (methylphosphonic acid) will be referred to herein as "ATMP." The ethylene diamino tetra(methylphosphonic acid) used in obtaining the data shown in FIGURE 2 will be referred to as "EDTMP." The potassium salt of EDTMP was prepared by mixing 100-percent active EDTMP and potassium hydroxide in a ratio of about 1.10 grams of EDTMP to one gram of hydroxide.

While the ATMP and EDTMP were both introduced as the potassium salts, it will be understood that at the lower pH of the test solution, the salts rapidly reverted to at least a partially acid form. Therefore, it has seemed best in the drawing and elsewhere to give the concentrations in parts per million of the acid portion of the salt rather than of the salt itself. Tests using the acid rather than the salt gave about the same results as when the salt was used.

Referring to FIGURE 1 of the drawing, the left side of the drawing at zero concentration of potassium pyrophosphate shows the scale-inhibiting effects of ATMP alone. As reported in the prior art, the presence of as little as about four parts per million of the phosphonic acid does an excellent job of inhibiting calcium sulfate scale even in the severe test which was used. About three parts per million of the acid provided only about 40-percent inhibition, while about two parts per million of ATMP gave a little over 20-percent inhibition in the absence of the pyrophosphate.

It should be noted at this point that, for values below about 60-percent scale inhibition, the tests give somewhat erratic results. For this reason, the curves in the drawing are dashed below this level. Both the results with about three and about two parts per million of the phosphonic acid without the pyrophosphate are in this erratic range so they should not be considered to be very accurate. It can be said, however, that both these lower concentrations gave rather poor results in the absence of the pyrophosphate.

Referring to the lower curve of FIGURE 1, it is apparent from the data that excellent results are provided by a combination of about two parts per million of the phosphonic acid with from about six to about nine parts per million of the pyrophosphate. Relatively poor results were obtained by using either more or less of the pyrophosphate with this low concentration of the acid. It is significant that 5.4 parts per million of potassium pyrophosphate alone gave no calcium sulfate scale inhibition in this test, while twenty parts per million of the potassium pyrophosphate alone gave only about 13 percent inhibition in one test and about 20 percent in another.

Referring to the curve in FIGURE 1, for three parts per million of ATMP, it is noted that the combination effect occurs over a much wider ratio of phosphonic acid to pyrophosphate when the concentration of the acid is increased. At the higher ATMP concentration, the pyrophosphate concentration for best results should be between about two and about ten parts per million.

The upper curve in FIGURE 1 shows that if the amino phosphonic acid concentration is as high as about four parts per million, the scale-inhibiting action is so great that it overcomes most of the adverse effects of the pyrophosphate at high concentrations.

In actual practice, the ratio of phosphonic acid to pyrophosphate will be fixed in any composition introduced into a well. Thus, it will not be possible to have the two-to-ten optimum pyrophosphate concentration with three parts per million of phosphonic acid, and, at the same time, have the six-to-nine optimum pyrophosphate concentration with two parts per million of phosphonic acid. Instead, it will be necessary to use a pyrophosphate-to-phosphonic acid ratio of between about two-to-one and about four-to-one, and, preferably, about three-to-one. The three-to-one ratio will give the following decreasing concentrations and degrees of inhibition as the batch of inhibitor becomes dissipated.

TABLE I

| Concentration, p.p.m. | | Percent Inhibition |
|---|---|---|
| ATMP | $K_4P_2O_7$ | |
| 4 | 12 | 99 |
| 3 | 9 | 98 |
| 2 | 6 | 81 |

By use of this compromise at a three-to-one ratio, good inhibition can be maintained until the ATMP concentration falls below two parts per million.

Considering all the data of FIGURE 1 together, it is evident that in order for the batch treatment to remain as effective as possible for as long as possible, the amount of potassium pyrophosphate should be between about two and about four times the amount of the particular amino phosphonic acid used in the tests reported in FIGURE 1. This is, therefore, the preferred ratio. Some combination effects at some concentrations occur outside this range, however, so other considerations, such as density and viscosity, particularly at low temperatures, may make advisable use of the combination outside this range of ratios.

Figure 2:
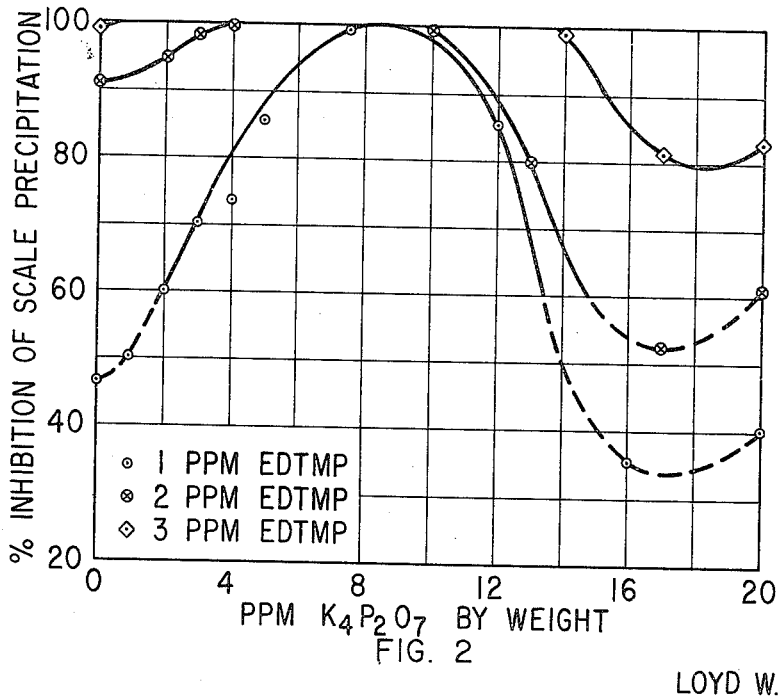

Referring to FIGURE 2, it will be apparent that the EDTMP behaved in the same manner as the ATMP. There were, of course, differences in the degrees of effectiveness of the two phosphonic acids, which would be expected from two such different members of this class of materials. The concentration of the EDTMP can be considerably lower than the concentration of ATMP and the ratio of the EDTMP to the less expensive pyrophosphate should also be somewhat lower than with the ATMP in order to get the best results. Preferably, the pyrophosphate concentration should be about three to seven times the concentration of the EDTMP. Ratios outside this range can, of course, be used with some benefits.

Before preparing a composition containing potassium pyrophosphate and any specific potassium phosphonate, it is advisable to check the optimum ratio of pyrophosphate-to-phosphonic acid. In general, however, the pyrophosphate concentration should be from about one to about twelve times the concentration of the amino phosphonic acid.

Four compositions were prepared having a pyrophosphate-to-ATMP ratio of about 2.9 to 1, which gave a pyrophosphate-to-potassium salt ratio of 1.8 to 1. These compositions are presented in Table II.

TABLE II

| | Percent by Weight | | | |
|---|---|---|---|---|
| | ATMP[1] | KOH | $K_4P_2O_7$ | Water |
| Composition Number: | | | | |
| 1 | 30 | 14 | 44 | 12 |
| 2 | 28.6 | 13.4 | 42 | 16 |
| 3 | 27.3 | 12.7 | 40 | 20 |
| 4 | 20.4 | 9.6 | 30 | 40 |

[1] Amino tri(methylphosphonic acid) 50 percent solution.

The values in Table II are somewhat misleading for two reasons. First, half the weight of ATMP shown in Table II is actually water. Second, when the potassium hydroxide reacts with ATMP, considerable water is produced. To avoid these difficulties, Table III was prepared, in which the total concentration of water is given, together with the concentration of the potassium salt, the densities of the compositions, and the results of cold tests. The cold tests were run by simply placing a bottle containing a composition and a thermometer in a liquid hydrocarbon bath containing Dry Ice for cooling.

TABLE III

| Composition number | Percent by Weight | | | Density, grams/ml. | Cold Test |
|---|---|---|---|---|---|
| | K₆ATMP¹ | K₄P₂O₇ | Water | | |
| 1 | 24.5 | 44.0 | 31.5 | 1.73 | Pourable at −12° F. |
| 2 | 23.4 | 42.0 | 34.6 | 1.70 | Pourable at −20° F. |
| 3 | 22.3 | 40.0 | 37.7 | 1.65 | Viscous at −20° F. |
| 4 | 16.7 | 30.0 | 53.3 | 1.45 | Solid at −8° F. |

¹ Potassium salt of amino tri(methylphosphonic acid).

The first composition in Tables II and III would be usable under most conditions but, upon standing, crystals form and settle to the bottom of the liquid. To avoid this difficulty, the total water content should obviously be somewhat greater than 31.5 percent. The composition containing 34.6-percent water performed very well in the cold test, although at minus 20° F. it was rather viscous. The third composition in the table was also somewhat viscous at minus 20° F., but much less so than the second composition. The fourth composition remained very nonviscous down to about minus 8° F., but at that temperature crystals formed which rapidly grew until they caused the entire composition to become solid. In very cold climates, it is obvious that the water content should be less than about 50 percent by weight to prevent crystallization, but above about 33 percent so the composition will remain pourable at temperatures down to about −20° F.

The densities of the first three compositions are rather remarkably high for liquid water solutions. By keeping the water content within a limited range, it is obviously possible to prepare a composition having a density between about 1.6 and about 1.7, which is still pourable at −20° F. and possesses the combination action of the amino phosphonates and the pyrophosphates.

Composition "1" in Tables II and III was used in the concentrations shown in Table IV with the indicated results. This was in the laboratory test previously described.

TABLE IV

| Concentration, p.p.m. | ATMP | K₄P₂O₇ | Percent Inhibition |
|---|---|---|---|
| Composition "1": | | | |
| 75,000 | 11,250 | 33,000 | (¹) |
| 100 | 15 | 44 | 98.6 |
| 27 | 4 | 11.9 | 99.0 |
| 13.5 | 2 | 5.9 | 88.5 |
| 10.0 | 1.5 | 4.4 | 20.0 |

¹ Phosphate Precipitate.

The results in Table IV confirm the prediction in Table I that, by using a compromise of about three times as much pyrophosphate as phosphonic acid, good results can be obtained as the composition is diluted until the concentration of ATMP drops below about two parts per million. Again, this shows the ability of high concentrations of amino phosphonic acids to overcome the adverse effects of high concentrations of pyrophosphates which appear at low concentrations of the phosphonic acids. The very high concentration test was run to determine the effects of mixing the treating agent with its high phosphate content with brines having a high calcium content. As expected, the result was a calcium phosphate precipitate. This precipitate had a small volume, however, and was of a fluffy, easily suspended type—probably due to the presence of the phosphonate—so little difficulty from phosphate precipitation should result from use of the phosphonate-phosphate combination.

In another test, with composition "1" of Tables II and III, the sulfate scale-inhibiting properties under less severe scaling conditions were determined. This test was the same as described before, except that instead of using a solution containing 10,000 parts per million of calcium sulfate in a solution also containing 50,000 parts per million of sodium chloride, a solution was used containing only 6,000 parts per million of calcium sulfate and 25,000 parts per million of sodium chloride. Results of the tests are presented in Table V.

TABLE V

| Concentration, p.p.m. | ATMP | K₄P₂O₇ | Percent Inhibition |
|---|---|---|---|
| Composition "1": | | | |
| 27 | 4 | 11.9 | 98.4 |
| 13.5 | 2 | 5.9 | 99.4 |
| 6.8 | 1 | 3.0 | 99.5 |
| 5 | 0.75 | 2.2 | 99.9 |
| 3 | 0.45 | 1.3 | 98.7 |
| 2 | 0.30 | 0.88 | 78.5 |
| 1 | 0.15 | 0.44 | 20.0 |

The results in Table V are important since they indicate that much lower concentrations of the phosphonate-pyrophosphate combination can be used under mild scaling conditions. Obviously, as little as 0.3 part per million of the phosphonic acid portion of the salt can be used under milder conditions. Under even milder conditions, still less of the combination can be used. Comparison of the data in Tables IV and V also shows how severe the test is which was used in obtaining the data for the curves in the drawing and for Table IV.

Composition "1" in Tables II and III was also used in various concentrations to determine the calcium carbonate scale-inhibiting ability of the combination of phosphonates and pyrophosphates. In the tests, a disc of perforated sheet metal 2½ inches in diameter was welded across the end of a tube ⅜-inch in diameter and 6 inches long. The tube was slip-fitted over a vertical shaft rotated at about 50 revolutions per minute. The perforated disc was at the bottom of this assembly and the shaft was at the top of the tube. An electric heater was arranged to extend from the end of the shaft into the tube. The tube and disc assembly was weighed and then immersed in 400 milliliters of saturated solution of calcium bicarbonate in a 600-milliliter tall-form beaker. This solution was prepared by adding an excess of solid calcium carbonate to water containing about 30,000 parts per million of sodium chloride and then bubbling carbon dioxide into the suspension to convert the carbonate to bicarbonate. The solution was allowed to settle and clear solution was poured off for use. The heater was adjusted to hold the solution temperature at about 185° F. After three hours under these conditions, the disc and tube assembly were removed, rinsed, dried, and weighed. A control test without inhibitor was run to permit calculating percent inhibition. Results of the tests are presented in Table VI.

TABLE VI

| Compositon "1" concentration, p.p.m.: | Percent inhibition |
|---|---|
| 10 | 89.2 |
| 7 | 87.8 |
| 5 | 88.3 |
| 2 | 60.0 |

It is obvious that the combination of phosphonate and pyrophosphate provided good inhibition for carbonate scale as well as for sulfate scale. The combination is also applicable to other scaling materials, such as barium sulfate and barium carbonate described in the phosphonic acid chelating art previously mentioned.

A composition was prepared using the EDTMP as follows:

| | Grams |
|---|---|
| EDTMP | 7.5 |
| KOH | 6.8 |
| $K_4P_2O_7$ | 21.0 |
| Water | 14.7 |

This preparation did not all go into solution until 6 grams of additional water were added. The potassium hydroxide reacted with the EDTMP to form the potassium amino phosphonate and water. The final composition was as follows:

| | Percent |
|---|---|
| $K_6$EDTMP | 21.6 |
| $K_4P_2O_7$ | 37.5 |
| Water | 40.9 |

The density of this solution was 1.67 grams per milliliter. It remained pourable at −20° F. In spite of the rather limited solubility of the EDTMP itself, it is obvious that the potassium salt is sufficiently soluble in water to permit preparation of a high-density, low pour-point water solution. While the salt is indicated to be $K_6$EDTMP, it probably was not exactly this salt. The neutralization was carried to a pH of about 12 where a break in the titration curve indicated substantially complete neutralization. Use of 20 parts per million of this phosphonate-phosphate composition in the test described in connection with the data presented in FIGURES 1 and 2 gave 99.5 percent inhibition. This is not surprising in view of the data in FIGURE 2 of the drawing, since 20 parts per million of the composition provided about 2.7 parts per million of EDTMP and about 7.5 parts per million of potassium pyrophosphate.

In preparing compositions, such as one just mentioned, or those in Tables II and III, one precaution should be taken. Some means should be provided for cooling the mixture as the various ingredients are mixed together. Both the solution of solid potassium hydroxide in water and the neutralization of the phosphonic acid by the base produce large amounts of heat. The order of addition of the ingredients does not seem to be important as long as adequate cooling is provided. In preparing such compositions, potassium hydroxide is greatly preferred to potassium carbonate to avoid the large volumes of carbon dioxide which are produced when the carbonate is used.

As noted in the prior art, the amino phosphonates are effective sequestering agents over a wide range of pH. The pH at which my agent will be operating in a well will be substantially the pH of the water in the well. Usually, there is not enough of the treating agent in the water to affect substantially the pH of the water. From this standpoint, the pH of the treating agent is unimportant. The potassium salts of the amino phosphonic acids are very much more soluble in water than the acids themselves. This is particularly true of the EDTMP. Therefore, it is important in the high-density, concentrated solutions that sufficient of a potassium base, such as potassium hydroxide or potassium carbonate, be used to replace most, if not all, the hydrogens of the acid. This requires that the pH be raised to at least about 8 or 9 in the absence of the pyrophosphate or to a pH of at least about 10 or 11 in the presence of the pyrophosphate. In addition, the potassium pyrophosphate is more stable at high pH than at low pH. For this reason too, sufficient potassium hydroxide or carbonate should be used in the treating agent to raise the pH of the agent to a value at least above about 8 and preferably to a value of about 10 or 11.

The high-density treating agent is designed primarily for use in wells where the additive is dumped in a batch of about 10-to-100 gallons into the annular space between the tubing and casing. In this case, the agent must fall to the bottom of the well through any liquids in the well. The agent may also be introduced down the tubing in flowing wells. In this case, the batch of agent falls only through the liquids below the bottom of the tubing. The distance between the bottom of the well and the level at which fluids enter the tubing should be sufficient to hold the volume of treating agent and leave at least about 20 feet between the top of the batch of treating agent and the level at which fluids enter the tubing. This permits the treating agent to remain relatively undisturbed in the bottom of the well and diffuse slowly into water entering the well from the formation. If desired, a separate small macaroni string can be run to the bottom of the well so the treating agent can be introduced into the bottom of the well without falling through the liquids in the well. Under some conditions, the agent can be introduced into the bottom of the well by means of a dump bailer. Still other methods of introducing the heavy treating agent into the bottom of the well, such as in water-soluble capsules, will occur to those skilled in the art.

Although the high-density treating agent is intended primarily for use in the bottom of a well, it will be obvious that the agent can also be used in other well known well-treating methods. For example, a batch of the agent can be squeezed into the earth formation from which it is then slowly produced back into the well with the formation fluids. The agent can also be introduced continuously down the tubing-casing annulus or down a macaroni string into the bottom of the well.

In methods such as the squeeze or continuous-treating processes, the concentrated agent should be diluted before use. Dilution to about ⅕ to about ¹⁄₂₀ the original strength is generally advisable. Dilution with water is possible and is usually preferred. If dilution with water produces freezing problems, these problems can be avoided by use of a 50-percent by volume mixture of methanol and water. It should be noted that other alcohols, such as ethanol and isopropanol, should not be used because of problems of solubility of the agent in water solutions of alcohols other than methanol. Volumes of diluted treating agent used in squeeze treating usually are from about 20 to about 60 barrels (42 U.S. gallons per barrel). The diluted solution is generally forced back into the formation with an over-flush of about a hundred or more barrels of water. Water mixed with the treating agent to dilute it should be fresh water to avoid the danger of exceeding the solubility product for some of the phosphates. Even the sodium pyrophosphates are relatively insoluble compared to the potassium pyrophosphates.

Still other uses of the phosphonate-phosphate combination are possible. For example, the combination can be used in water flowing to water heaters, such as emulsion treaters or steam generators used in oil fields. The combination can also be used in other applications, such as cooling towers. In some such applications, the life of the combination may be rather limited, however, due to the decomposition of the phosphonates by other water-treating chemicals, such as chlorine. In many of these applications, the amino phosphonate, or amino phosphonic acid, and the pyrophosphate may be separately added to the water to be treated. Usually, however, it is better to pre-mix the phosphate and phosphonate or phosphonic acid to insure that they are present within the desired ratio limits. When reference is made to adding a phosphonic acid to water, it will be understood that the acid can be added as such or as a water-soluble salt, such as the sodium or potassium salt.

The amino phosphonates and the pyrophosphates described above have been the potassium salts. At lower pH levels, the salts are only partial salts but the only metallic ion has been potassium in the materials described above. Except for dilute solutions containing only about 5 percent pyrophosphate, potassium has no alternate because of solubility problems with the other salts. The pyrophosphate also has no alternates except where short-storage life of water solutions is permissible. In such cases, the tripolyphosphate is an equivalent.

The amino phosphonates and amino phosphonic acids are those previously described in the prior art and particularly in U.S. Patents 3,234,124 Irani; and 3,336,221 Ralston. Among these, the materials which seem to be preferred are salts of the acids represented by the formula $R'—N(R)_2$ where R is

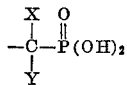

X and Y being hydrogen or methyl groups and R' is R or $—(CH_2)_mN(R)_2$, $m$ being an integer from 2 to 6. The two materials of most interest within this preferred group are the ethylene diamino tetra(methylphosphonic acid) salt and the amino tri(methylphosphonic acid) salt. Of these two, the amino tri(methylphosphonic acid) salt is preferred for my purposes. It is somewhat less effective at very low concentrations than the ethylene diamine derivative but the much lower cost permits use of a higher concentration which more than offsets the difference in effectiveness.

When the concentrations of potassium amino phosphonate and potassium pyrophosphate are high, the purity of the solution becomes rather critical. Only very small amounts of other materials, such as excess potassium hydroxide, should be present. In preparations having lower concentrations of the phosphonate and pyrophosphate, however, small amounts of other materials may be present. These may include excess potassium hydroxide to increase the pH of the agent, potassium carbonate to repress solution of calcium ions when treating wells in limestone, potassium carboxymethyl cellulose, or other gums, to increase the viscosity for use in wells with high bottom-hole temperatures, or wells with fluid entry from the formation near the bottom of the well, or the like. When a composition is said to consist essentially of the phosphonate, the pyrophosphate, and water, therefore, it will be understood that the composition can also include small amounts of other materials which do not substantially adversely affect the properties of the treating agent or its actions in inhibiting scale formation.

My invention will be better understood from the following examples of use of my scale inhibitor in oil wells. A well in the Odessa area in Texas rapidly plugged with scale as evidenced by a sharp decline in fluid production. Shortly after cleaning, the well was producing about 109 barrels of oil per day. Three months later, the production had dropped to 92 barrels of oil per day, and, after six months, production had decreased to only 61 barrels of oil per day. The well was cleaned again by detergent, scale remover and acid. Production increased to about 127 barrels of oil per day. The well was then treated with 60 gallons of my scale inhibitor diluted with 25 barrels of fresh water (42 U.S. gallons per barrel). The diluted inhibitor was squeezed into the formation and was followed by a 300-barrel flush or fresh water. The undiluted scale inhibitor was an aqueous solution containing about 26 percent by weight of a potassium salt of amino tri (methylphosphonic acid) and about 27 percent by weight of potassium pyrophosphate.

One month after treatment, water produced from the well still contained about 24 parts per million of the inhibitor. Corresponding concentrations at the ends of two and three months were 18 and 11 parts per million. The production rate of the well remained substantially constant at about 120 barrels of oil per day. The inhibitor prevented deposition of scale and thereby avoided rapid decline in production.

The production rate of a second well in the same area had declined to only about two barrels of oil per day. After the well was acidized, the production rate increased to about 14 barrels of oil per day. This well was treated by pouring down between the tubing and casing 15 gallons of the undiluted inhibitor of the same composition as used in the first well. The inhibitor was flushed down the well by introducing about ten barrels of oil into the tubing-casing annulus following the inhibitor slug. The scale inhibitor, being oil-insoluble, was not diluted by the oil and therefore retained its high density and rapidly settled to the well bottom. After about a month, the scale inhibitor concentration in produced water had dropped to only about 11 parts per million. After four months, the inhibitor concentration in produced water was still about 11 parts per million. After four months, the oil production rate was about 12 barrels per day with no evidence of scale in the pump or inside the tubing. Scale seemed to be depositing on the outside surface of the tubing. This is thought to be due to evaporation effects caused by gas production through the annulus.

It will be obvious from the above description and examples that I have accomplished the objects of my invention. A liquid aqueous phosphonate scale inhibitor solution has been provided, this solution having a density of as much as 1.7 grams per milliliter and the solution remaining pourable at temperatures down to about $-20°$ F. Several variations have been described. Still others will occur to those skilled in the art. Therefore, I do not wish to be limited to the variations described, but only by the following claims.

I claim:

1. A composition for inhibiting alkaline earth sulfate, carbonate and mixed sulfate and carbonate scale formation in water, said composition comprising potassium pyrophosphate and the potassium salt of an amino phosphonic acid having the formula $$R'—N_x(R)_2$$

where R is

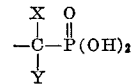

X and Y being selected from the group consisting of hydrogen and methyl groups,
and R' is selected from the group consisting of —R and $—(CH_2)_mN(R)_2$, $m$ being an integer from 2 to 6, the weight of said potassium pyrophospate being from about 1 to about 12 times the weight of the amino phosphonic acid portion of said salt.

2. The composition of claim 1 consisting essentially of said pyrophosphate and said amino phosphonic acid salt together with sufficient water to form a liquid aqueous solution.

3. The composition of claim 2 having a pH of at least about 8 and a water content of less than about 50 percent by weight whereby the density of said solution is at least about 1.5 grams per milliliter.

4. The composition of claim 1 in which said amino phosphonic acid is amino tri(methylphosphonic acid), said composition consists essentially of said pyrophosphate, said amino phosphonic acid salt and from about 33 to about 50 percent by weight of water, and the pH of the solution is at least about 10, whereby said composition is an aqueous solution having a density of at least about 1.5 grams per milliliter and remains pourable at temperatures down to at least about $-20°$ F.

5. The composition of claim 4 in which the weight of said pyrophosphate is from about 2 to about 4 times the weight of the amino phosphonic acid portion of said salt.

6. The composition of claim 1 in which said amino phosphonic acid is ethylene diamino tetra(methylphosphonic acid), said composition consists essentially of said pyrophosphate, said amino phosphonic acid salt and from about 33 to about 50 percent by weight of water, and the pH of the solution is at least about 10, whereby said composition is an aqueous solution having a density of at least about 1.5 grams per milliliter and remains pourable at temperatures down to at least about −20° F.

7. The composition of claim 6 in which the weight of said pyrophosphate is from about 3 to about 7 times the weight of the amino phosphonic acid portion of said salt.

8. A process for inhibiting sulfate, carbonate and mixed sulfate and carbonate scale precipitation in water comprising adding to said water sufficient potassium pyrophosphate and an amino phosphonic acid to inhibit said scale formation, said amino phosphonic acid having the formula

where R is

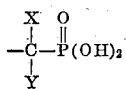

X and Y being selected from the group consisting of hydrogen and methyl groups, and R' is selected from the group consisting of —R and —$(CH_2)_mN(R)_2$, $m$ being an integer from 2 to 6, the weight of said potassium pyrophosphate being from about 1 to about 12 times the weight of the amino phosphonic acid.

9. The method of claim 8 in which said amino phosphonic acid is amino tri(methylphosphonic acid), the concentration of the amino phosphonic acid is at least about 2 parts per million by weight of the water, and the concentration of said pyrophosphate is from about 2 to about 4 times the concentration of said acid.

10. The method of claim 8 in which said amino phosphonic acid is ethylene diamino tetra(methylphosphonic acid), the concentration of the amino phosphonic acid is at least about 1 part per million by weight of the water, and the concentration of said pyrophosphate is from about 3 to about 7 times the weight of the acid.

11. The method of treating a well to inhibit precipitation of scale in the well comprising introducing into the top of the well and allowing to fall through liquids in said well to the bottom of said well the aqueous solution of claim 3 having a density of at least about 1.5 grams per milliliter, whereby said solution is capable of rapidly dropping through any water in said well and has an increased tendency to stay in the bottom of the well and diffuse slowly into water flowing from the formation into said well.

12. The method of claim 11 in which said solution has a density at least 0.5 gram per milliliter greater than the density of water produced by said well.

References Cited
UNITED STATES PATENTS

| | | | |
|---|---|---|---|
| 2,970,959 | 2/1961 | Jones | 252—8.55 |
| 3,336,221 | 8/1967 | Ralston | 210—58 |

MICHAEL E. ROGERS, Primary Examiner

U.S. Cl. X.R.

166—42; 252—8.55, 87, 181